United States Patent [19]
Hirano et al.

[11] Patent Number: 5,640,315
[45] Date of Patent: Jun. 17, 1997

[54] SWITCHING REGULATOR

[75] Inventors: Hosei Hirano, Kawasaki; Tetsuro Tanaka, Kagoshima, both of Japan

[73] Assignee: Nippon Steel Corporation, Tokyo, Japan

[21] Appl. No.: 405,989

[22] Filed: Mar. 17, 1995

[30] Foreign Application Priority Data

Mar. 18, 1994 [JP] Japan .................................. 6-073955
May 13, 1994 [JP] Japan .................................. 6-124285

[51] Int. Cl.$^6$ .................................................. H02M 7/12
[52] U.S. Cl. ................................................ 363/41; 363/95
[58] Field of Search ............................. 363/21, 282, 41, 363/95

[56] References Cited

U.S. PATENT DOCUMENTS

| | | | |
|---|---|---|---|
| 4,387,418 | 6/1983 | Koike | 363/19 |
| 4,677,534 | 6/1987 | Okochi | 363/21 |
| 4,691,269 | 9/1987 | Yamane et al. | 363/41 |
| 5,109,185 | 4/1992 | Ball | 323/247 |
| 5,376,872 | 12/1994 | Hara | 363/41 |

FOREIGN PATENT DOCUMENTS 63-69465  3/1988  Japan .

OTHER PUBLICATIONS

The Practical Power Source Circuit Design Hand Book, J. Togawa, CQ, Publication, pp. 92–175.
The Practical Electronic Circuit Hand Book 4, CQ, Publication, pp. 254–259.
The Transistor Technology Special No. 28, CQ, Publication, pp. 54–143.

Primary Examiner—Peter S. Wong
Assistant Examiner—Derek J. Jardieu
Attorney, Agent, or Firm—Pollock, Vande Sande & Priddy

[57] ABSTRACT

A switching regulator including: a switching element connected to an input DC signal and operating for turning-on and -off the input DC signal to produce an AC signal such as a rectangular wave signal; a rectifier for rectifying the AC signal thereby generating an output voltage; a circuit for producing a frequency-variable triangular wave signal having a constant amplitude; a comparator for comparing the triangular wave signal with the output voltage of the rectifier thereby obtaining a pulse-width modulated signal used for controlling the operation of the switching element; a modulation signal generator for generating a modulation signal having an amplitude variable in asynchronism with the frequency of the triangular wave signal; a sampling and holding circuit for sampling the modulation signal at a timing in synchronism with the frequency of the triangular wave signal or preferably at the timing of a maximum or minimum value of the triangular wave signal and holding the sampled modulation signal; and a circuit for modulating the frequency of the triangular wave signal preferably within a range of about 0.8 to 1.2 times of a predetermined center frequency based on the voltage value of the modulation signal as sampled and held.

12 Claims, 13 Drawing Sheets

SWITCHING REGULATOR

BACKGROUND OF THE INVENTION

1. Field of the Invention

The present invention relates to a switching regulator for producing a pulse-width modulated switching signal used for controlling a switching element connected between an input DC signal and a rectifier so that an AC signal such as a rectangular-wave signal is produced from the input DC signal by turning-on and -off the switching element at timings determined by the pulse-width modulated switching signal and a predetermined output voltage is produced from the rectifier by rectifying the AC signal.

2. Description of the Related Art

FIG. 13 shows a construction of a conventional separately-exited forward switching regulator. In FIG. 1, 1 designates a power source input section for receiving an input voltage $V_I$ and 2 designates a switching element to be turned on and off for obtaining an AC voltage such as a rectangular-wave voltage from the input voltage $V_I$. A semiconductor element such as a transistor, an FET or an IGBT is used for this switching element. 3 designates an isolation transformer for applying an AC voltage to the next stage circuit and 4 designates a rectification smoothing circuit for rectifying and smoothing the AC voltage outputted from the transformer 3 thereby obtaining an output voltage $V_O$. The rectification smoothing circuit is structured by diodes 4a and 4b, a choke coil 4c and a capacitor 4d. 5 designates a load to which the output voltage $V_O$ is supplied.

6 designates a voltage dividing circuit, structured by a resistance element, for dividing the output voltage $V_O$ and detecting variations $V_{O1}$, $V_{O2}$, etc. of $V_O$. 7 designates a triangular wave signal generating circuit for generating a triangular wave signal 8 of a predetermined frequency. This triangular wave signal generating circuit has a known structure such that the charging and discharging of a capacitor are controlled by a transistor, thereby generating a triangular wave signal 8, 9 designates a comparator including an error amplifier for comparing the output voltage of the voltage dividing circuit 6 with the triangular wave signal 8 and amplifying the difference therebetween thereby outputting a pulse-width modulated control signal. 10 designates a driving circuit for converting the pulse-width modulated control signal into a switching signal 11 which is adapted for driving the switching element 2.

The operation according to the above-described structure will be explained below.

The input voltage $V_I$ received by the power source input section 1 is converted into an AC voltage such as a rectangular wave voltage by turning-on and -off the switching element 2 as controlled by the switching signal 11 obtained from the drive circuit 10. This AC voltage is rectified and smoothed by the rectification smoothing circuit 4 as applied thereto through the transformer 3 and the output voltage $V_O$ is supplied to the load 5.

The output voltage $V_O$ is detected by the voltage dividing circuit 6 and is added to the comparator 9, which compares the output of the voltage dividing circuit 6 with the triangular wave signal 8 obtained from the triangular wave signal generating circuit 7. The pulse-width modulated control signal obtained by the comparator is used through the drive circuit 10 as the switching signal 11 to control the turning-on and -off of the switching element 2. With the above-described structure and operation, the output voltage $V_O$ is controlled to be constant.

FIG. 14 shows a timing chart for explaining the operation of the comparator 9. FIG. 14A shows the relation between the output voltage $V_O$ and the triangular wave signal 8 when the output voltage $V_O$ changes to $V_{O1}$ or $V_{O2}$. FIG. 14B shows the pulse width of the pulse-width modulated control signal obtained when the output voltage $V_O$ changes to $V_{O1}$ or $V_{O2}$. It is clear from FIG. 14B that the pulse width becomes smaller when the output voltage changes to a higher voltage $V_{O1}$ and becomes large when the output voltage changes to a lower voltage $V_{O2}$.

The output voltage $V_O$ is stabilized by turning-on and -off the switching element 2 according to the pulse-width modulated pulse voltage as described above. It is known that in the ideal circuit there exists the following relation between the turning-on to turning-off ratio (called a time ratio) and the output voltage $V_O$.

$$V_O = \text{TON}/(\text{TON}+\text{TOFF}) \times NS/NP \times V_I \qquad (1)$$

where, TON represents the time during which the pulse voltage is at the high level H in FIG. 14, TOFF represents the time during which the pulse voltage is at the low level L in FIG. 14. NP represents the number of turns of the primary winding of the transformer 3 in FIG. 13 and NS represents the number of turns of the secondary winding thereof.

As is clear from the above explanation and expression (1), when the output voltage $V_O$ has changed by the load or when the input voltage $V_I$ has changed, a constant output voltage $V_O$ can be obtained by changing the time ratio of TON to TOFF.

In the above-described pulse-width modulation control type of the separately excited forward switching regulator, a triangular wave signal of a constant frequency is used so that when the load is stable and the input voltage is constant, the switching element is turned on and off at a constant frequency. In this case, a conduction noise which is conducted inside the circuit and a radiation noise which is radiated outside the circuit also has respective peaks at specific frequency.

FIG. 15 shows one example of the above case. Conduction noise included in the input voltage is measured by a spectral analyzer. The ordinate indicates the noise voltage level and the abscissa indicates the frequency. In FIG. 15, the noise indicated by A is a noise according to the fundamental wave of the turning-on and -off frequency of the switching element (switching frequency), the noise indicated by B is a noise of higher harmonic thereof, and the noises indicated by C and D are known as noises which are generated by leakage magnetic flux attributable to reverse recovery characteristics of the secondary side rectifier diode or the arrangement in winding of the transformer.

Although FIG. 15 shows an example of the spectral analysis of conduction noise, the radiation noise is also generated in a manner similar to the conduction noise and has the same frequency characteristics as those of the conduction noise.

The above-described noises generate undesired sounds and/or adversely affect various kinds of other electronic devices. In order to restrict the peak value of the noise level, a noise filter circuit or the like made of a capacitor and an inductor has been used conventionally. This method is effective in attenuating the peak level of the generated noise. However, in order to attenuate the peak level sufficiently, it has been necessary to use expensive capacitor and inductor having excellent attenuation characteristics or to connect in multi-stage filter circuits each made of a capacitor and an inductor. Each of these methods has problems in that it is expensive and the space for assembling the circuit becomes larger by the multi-stage connection.

Apart from the above methods, a method is known for dispersing the fundamental frequency of the switching within a certain frequency range so as to prevent the noise peaks from occurring at a specific frequency. This method is disclosed in, for example, Japanese Patent Unexamined Publication JP-A-63-69465.

According to the method disclosed in the above publication, the frequency of the triangular wave signal used for determining the fundamental frequency of the switching is changed at random within a given range so that the fundamental frequency component and higher harmonic component of noise are dispersed within a given frequency range.

The method disclosed in the above publication seems to be effective to restrict the noise peak level. However, when this method is actually applied to the separately excited forward switching regulator shown in FIG. 13, the following problems have occurred.

According to the above publication, the restriction of the noise peak level is achieved by changing the frequency of the triangular wave signal within a range of $f_p+1/2fb$ to $f_p-1/2fb$, where $f_p$ is a center frequency of the triangular wave signal and fb is a maximum range in variation of the triangular wave signal and the effect of noise dispersion is larger as fb is larger. In order to apply the above method to the separately excited forward switching regulator shown in FIG. 13 the present inventors conducted experimental study under a condition of fp=100 KHz and fb=100 KHz. In other words, the frequency of the triangular wave signal was freely changed within the frequency range of 50 to 150 KHz. In order to carry out the experimental study under the above condition, the transformer 3 of the separately excited forward switching regulator shown in FIG. 13 was first designed.

Usually, when the transformer of the separately excited forward switching regulator is designed, magnetic characteristics of the magnetic material used for the transformer are taken into consideration.

Maximum variation ΔB of the magnetic flux density of the transformer is determined by the input voltage V1 applied to the primary winding of the transformer, a turning-on time (ton) for which the switching element is turned on in one cycle of the switching frequency of the switching element, a number Np of turns of the primary winding of the transformer and a sectional area S of the magnetic core on which the primary winding is wound and represented by the following expression.

$$\Delta B = V1 \times ton/(Np \times S) \quad (2)$$

The possible maximum value of ΔB is limited by the magnetic material of the transformer, the switching frequency and the ambient temperature. For example, in the case of soft ferrite that is widely used for the transformer of the switching regulator, the range of ΔB is from about 0.2 to 0.4 T (tesla) for the transformer of the separately excited forward switching regulator using one switching element when the frequency is 100 KHz and ambient temperature is 60 degrees.

According to the above conditions, when a transformer having a primary winding of Np=20 turns for use with a switch regulator operating at a condition that the input voltage V1 is 130 volts (DC) and the switching frequency is equal to the fundamental frequency 100 KHz is made of a soft ferrite which is operative with an upper limit of ΔB being 0.3 T, the size (cross-section) S of the transformer is calculated as follows:

$$S = 108.3 \text{ mm}^2.$$

In the above calculation, the time ton is assumed to be 0.5 times of one period of the switching frequency. It is well known in the art that the upper limit of the time ton is set to 0.5 times of one period of the switching frequency when designing the transformer of the separately excited forward switching regulator.

However, in implementing the method of the above publication by using the transformer having the above-described cross section S, a magnetic saturation occurs when the randomly changing frequency becomes lower than 100 KHz. As is clear from the expression (2), when the switching frequency becomes lower, or when the time ton is increased, ΔB increases.

Since the rate of the increase of ΔB is inversely proportional to the switching frequency, immediately when the switching frequency is changed to the minimum frequency 50 KHz, ΔB becomes 0.6 T which is two times of the value of ΔB taken when the frequency is 100 KHz. Thus, the value of ΔB substantially exceeds the upper limit 0.3 T of ΔB of the transformer material as used, and the magnetic saturation occurs. When the transformer is saturated, heating of the transformer increases rapidly and this heating thermally destroys windings and bobbin portions which constitute the transformer or extremely reduces the life of the electronic parts such as the capacitors and semiconductor elements provided around the transformer. Further, the current peak of the primary winding increases thereby to destroy the electronic parts on the primary side.

To solve the above problems, there is a method of increasing the number of turns of the primary winding of the transformer. This method, however, has a problem that, along with the increase of the number of turns, copper loss produced in the winding increases, the space for the winding (transformer window area) increases, resulting in the necessity of using a large size transformer. There is also a method of increasing the cross section of the transformer. However, in the above-described example, when the switching frequency is 50 KHz, the transformer cross section required for preventing the value of ΔB from exceeding its upper limit is S=216.4 mm², which is two times of the value designed for the frequency of 100 KHz. This extremely increases the space of assembly on the substrate and also makes the cost very expensive.

There also arises a problem in the smoothing operation at the secondary side. A triangular wave ripple is superimposed on a DC current flowing through a smoothing choke coil 4c in FIG. 13. The ripple current value is obtained by the following expression.

$$Irip = V_o/(L \times f) \times (1 - NP/NS \times V_o/V_i) \quad (3)$$

where Irip represents a ripple current, L an inductance of the choke coil and f a switching frequency.

As is clear from the expression (3), when the switching frequency f becomes lower, Irip increases, and when the switching frequency f changes from 100 KHz to 50 KHz in the above example, the ripple current becomes two times of the ripple current at the frequency 100 KHz.

The ripple current component which flows through the choke coil causes a fluctuation component of the output voltage $V_o$ as multiplied by the impedance component of the smoothing capacitor 4d in FIG. 13.

Accordingly, the increment of the ripple current directly causes the fluctuation component of the output voltage. In order to solve this problem, it is necessary to use a large inductance of the choke coil. For this purpose, it is necessary to use a large size of the choke coil itself, which extremely increases the space for assembly on the substrate and also makes the cost very expensive. Alternatively, there is a method of using low impedance parts, which, however, results in a larger size of each part and high costs similarly to the choke coil case.

As described above, in the separately excited forward switching regulator, when the method disclosed in the above-mentioned publication is implemented, it is possible to expect a noise dispersion effect or an effect of reduction of the noise peak level by increasing the range in variation of the frequency of the triangular wave signal from its center frequency. However, it is practically difficult to implement this method because of increase in loads of the transformer and the smoothing coil and capacitor at the secondary side, each having frequency dependent characteristics. It would be easy to reduce the loads by reducing the range in variation of the frequency. However, this has a possibility of decreasing the noise peak reduction effect obtained by dispersing the noise frequency within a certain frequency range.

As explained above, the range in variation of the frequency of the triangular wave signal from its center frequency is a very significant problem for electronic parts having characteristics dependent on the switching frequency.

There is also a problem in the timing for modulating the frequency of the triangular wave signal. The present inventors carried out experimental study while selecting as the above timing an integer times the period of the center frequency of the triangular wave signal. For example, a timer was used to produce a trigger signal at every ten periods of the frequency of 100 KHz and the triangular wave signal was modulated in response to this trigger signal. As a result of the experimental study, the effect of noise dispersion or the reduction of the noise peak level was observed by about 5 to 10% from the level before the modulation, but sufficient reduction was not obtained yet.

Next, it was tried to set the trigger period at the center frequency, but this was unsuccessful because the triangular wave signal was subjected to hunting. Usually, the triangular wave signal is produced by charging and discharging a capacitor. However, the hunting occurred because it was tried to conduct the modulation during charging or discharging of the capacitor. The interval and the timing of the modulation of the triangular wave signal is also an important factor in the actual implementation, as described above. However, this point is not described in the above publication or other literatures.

The above explains the problems which occur in the case of the separately excited forward switching regulator. Similar problems also occur in the case of the separately excited chopper type switching regulator. The separately excited chopper type has no isolation transformer in its structure unlike the separately excited forward type. However, the problems that occur in the electronics parts having frequency dependency, such as the smoothing choke and the capacitor are the same as the problems in the separately excited forward type. Further, the separately excited flyback switching regulator is different in smoothing operation at the secondary side from the separately excited forward switching regulator. However, the problems that occur in the isolation transformer are the same for both types of the switching regulators.

As described above, an attempt to reduce the peak values of the conduction noise and radiation noise by changing at random the frequency of the triangular wave signal has a problem that the transformer and the secondary side smoothing choke coil and capacitor having frequency dependent characteristics are subjected to excessive loads when the range in modulation of the frequency increases.

Further, in the actual implementation, it is necessary to produce a random signal used for randomly modulating the frequency. As a generally known method, there is a method of obtaining a random signal by a DA conversion after building up a logic according to the Monte Carlo method or the like by a circuit made of digital IC's. These methods, however, require at least three IC's including an IC for logic, an IC for a clock and an IC for DA conversion, requiring a complex circuit structure, and further involve another problem that the frequency of the clock for IC driving causes noise.

The above-described problems of the prior art techniques are described in, for example, "The Practical Power Source Circuit Design Hand Book", Jiro Togawa, CQ Publication, "The Practical Electronic Circuit Hand Book 4" CQ Publication and "The Transistor Technology Special No. 28" CQ Publication, etc.

SUMMARY OF THE INVENTION

It is an object of the present invention to provide a switching regulator for producing a pulse-width modulated signal used for controlling the turning-on and -off of a switching element by using a triangular wave signal and capable of restricting an occurrence of noise of a specific frequency.

In order to achieve the above object, according to the present invention, a switching regulator for producing a pulse-width modulated signal used for controlling the turning-on and -off of a switching element by using a triangular wave is arranged to disperse the frequency of generated noise in a predetermined frequency range so as to reduce the peak noise level, so that an occurrence of noise of a specific frequency can be restricted by a circuit which is simple in structure and easy in selection and designing of circuit elements.

According to a first aspect of the present invention, a switching regulator includes: a switching element connected to an input DC signal and operating for turning-on and -off the input DC signal to produce an AC signal; a rectifier for rectifying the AC signal thereby generating an output voltage; a circuit for producing a frequency-variable triangular wave signal having a constant amplitude; means for comparing the triangular wave signal with the output voltage of the rectifier thereby obtaining a pulse-width modulated signal used for controlling an operation of the switching element; a modulation signal generator for generating a modulation signal having an amplitude variable in asynchronism with a frequency of the triangular wave signal; a sampling and holding circuit for sampling the modulation signal at a timing of a maximum value or a minimum value of the triangular wave signal and holding the sampled modulation signal; and a circuit for modulating the frequency of the triangular wave signal based on a voltage value of the modulation signal as sampled and held.

According to the above-described structure, the modulation of the frequency of the triangular wave signal is started at the timing of the maximum value or the minimum value of the triangular wave signal, so that the waveform of the triangular wave signal is not subjected to hunting and the switching regulator can be controlled with high accuracy, with a result that an excellent effect in reduction of noise peak can be obtained as shown in FIG. 10.

According to a second aspect of the present invention, a switching regulator includes: a switching element connected to an input DC signal and operating for turning-on and -off the input DC signal to produce an AC signal; a rectifier for rectifying the AC signal thereby generating an output voltage; a circuit for producing a frequency-variable triangular wave signal having a constant amplitude; means for comparing the triangular wave signal with the output voltage of the rectifier thereby obtaining a pulse-width modulated signal used for controlling an operation of the switching element; a modulation signal generator for generating a modulation signal having an amplitude variable in asynchronism with a frequency of the triangular wave signal; a sampling and holding circuit for sampling the modulation signal at a timing which is synchronous with the frequency of the triangular wave signal and holding the sampled modulation signal; and a circuit for modulating the frequency of the triangular wave signal within a range of about 0.8 to 1.2 times of a predetermined center frequency based on a voltage value of the modulation signal as sampled and held.

According to the above-described structure, since the change of the frequency of the triangular wave signal is within the range of 0.8 to 1.2 times of the center frequency, the transformer is not saturated so that the selection and designing of the circuit elements are facilitated, and an excellent effect in reduction of noise peak can be obtained as shown in FIG. 7.

According to a third aspect of the present invention, a switching regulator includes: a switching element connected to an input DC signal and operating for turning-on and -off the input DC signal to produce an AC signal; a rectifier for rectifying the AC signal thereby generating an output voltage; a circuit for producing a frequency-variable triangular wave signal having a constant amplitude; means for comparing the triangular wave signal with the output voltage of the rectifier thereby obtaining a pulse-width modulated signal used for controlling an operation of the switching element; a modulation signal generator for generating a modulation signal having an amplitude variable in asynchronism with the frequency of the triangular wave signal; a sampling and holding circuit for sampling the modulation signal at a timing of a maximum value or a minimum value of the triangular wave signal and holding the sampled modulation signal; and a circuit for modulating the frequency of the triangular wave signal within a range of about 0.8 to 1.2 times of a predetermined center frequency based on a voltage value of the modulation signal as sampled and held.

According to the above-described structure, the modulation of the frequency of the triangular wave signal is started at the timing of the maximum value or the minimum value of the triangular wave signal, so that the waveform of the triangular wave signal is not subjected to hunting and the switching regulator can be controlled with high accuracy and further since the change of the frequency of the triangular wave signal is within the range of 0.8 to 1.2 times of the center frequency, the transformer is not saturated so that the selection and designing of the circuit elements are facilitated, with a result that an excellent effect in reduction of noise peak can be obtained as shown in FIG. 7 and FIG. 10.

DESCRIPTION OF THE PREFERRED EMBODIMENTS

Before explaining the embodiments of the present invention, the principle of the present invention will be explained below.

The present inventors have determined a relationship between the frequency modulation range of the triangular wave signal and the noise peak level based on experimental study. The experimental study was carried out by observing the noise peak level while changing the frequency modulation range of the triangular wave signal in the switching regulator shown in FIG. 13.

Figure 7:
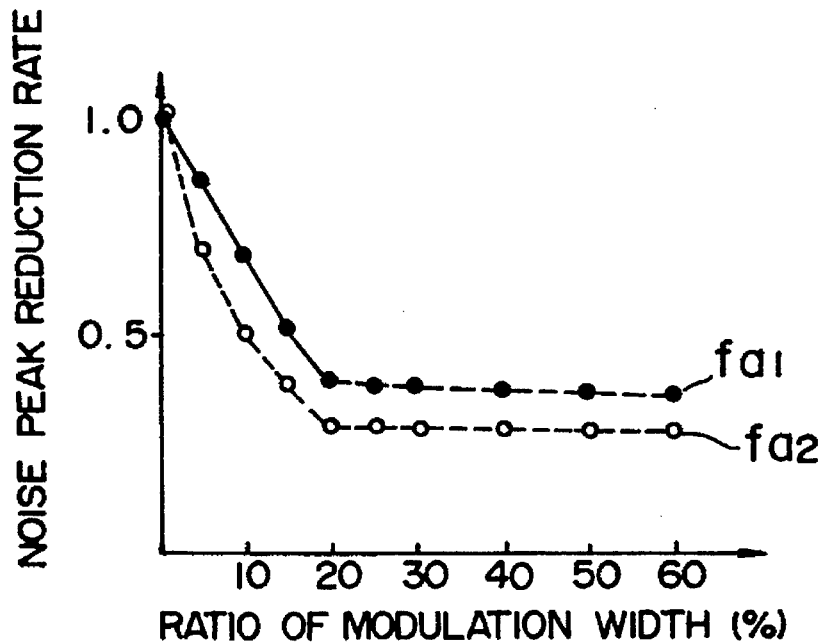
FIG. 7 is a graph showing the result of measuring the noise peak reduction rate while changing the ratio of the modulation width of the triangular wave signal.

FIG. 7 shows the result of the experimental study. Referring to FIG. 7, the ordinate indicates the reduction rate of the noise peak level which is obtained as follows:

Noise peak levels are measured before and after the frequency modulation is carried out and the highest ten peak values of the noise peak levels as measured are selected in each of before modulation and after modulation. By using an average of the highest ten peak values in each case, the reduction rate of the noise peak level is determined from the following expression.

Reduction rate = (average of peak values after modulation)/(average of peak values before modulation)    (4)

Figure 8:
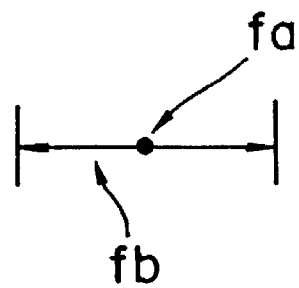
FIG. 8 is a diagram for explaining the definition of the ratio of the modulation width of the triangular wave signal.

The above expression is used in order to eliminate the affect of the background noise at the time of measuring noise by a spectral analyzer. The abscissa indicates the ratio of the width of the modulation frequency or modulation width to the center frequency of the triangular wave signal. The definition of this ratio will be explained with reference to FIG. 8. Referring to FIG. 8, fa shows the center frequency and fb shows the width of the modulation frequency. In this case, the ratio of the modulation width is defined by the following expression.

Ratio of the modulation width $(\%) = (fb/2)/fa \times 100$ (5)

In FIG. 7, fa1 shows the reduction rate of the noise peak when the center frequency is 100 KHz and fa2 shows the same when the center frequency is 200 KHz.

As is clear from FIG. 7, the noise peak level decreases when the modulation width of the frequency is increased. It is recognized that the above variation is almost linear when the ratio of the modulation width is 20% or less and the noise peak reduction effect is not observed when the ratio of the modulation width is larger than 20%. This trend is attributable to the fact that when random signals are produced artificially within a frequency range predetermined around a certain center frequency, the frequencies of the generated random signals are distributed such that the center frequency appears most frequently. This relation is not changed even if the center frequency is changed and common to the separately excited chopper switching regulator and the separately excited flyback switching regulator, as well as the separately excited forward switching regulator.

According to the above experimental study, it is discovered that a sufficient noise reduction effect can be obtained when the frequency is changed at random within a frequency range of +20%—20% of a given center frequency or 0.8 times to 1.2 times of the center frequency and it is unnecessary to make the modulation width larger than the above range. Based on this fact, at the time of designing the switching regulator, it is possible to determine the upper and lower limits in design of the transformer and the smoothing choke coil and capacitor at the secondary side, and it is also possible to determine sufficiently necessary conditions (sizes and characteristics values) of the parts for noise reduction.

Figure 9:
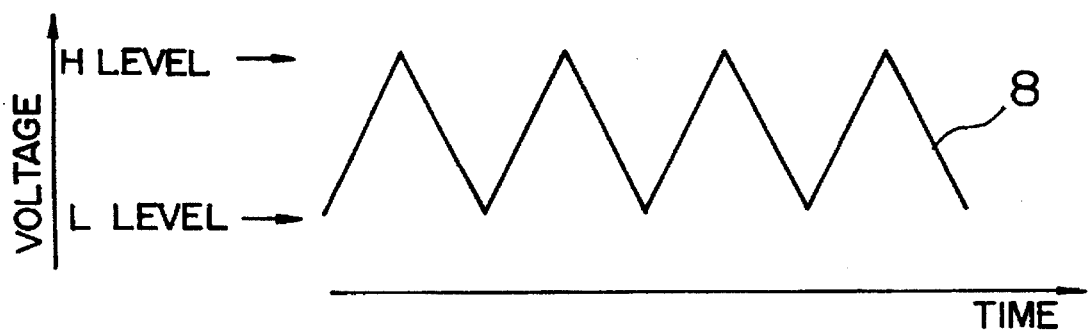
FIG. 9 is a diagram for explaining the timing of the modulation of the triangular wave signal.

Next, as the timing of changing the frequency, it is desired to change the frequency in synchronism with the frequency of the triangular wave signal, particularly in synchronism with the maximum value or minimum value of the triangular wave signal. With this arrangement, it is possible to prevent the modulation from being conducted during charging or discharging of the capacitor for generating the triangular wave signal. In more detail, it is desired that a trigger signal is produced immediately or near when the triangular wave signal reaches the H level or the L level and the modulation is carried out at the timing of this trigger signal, as shown in FIG. 9.

Figure 10:
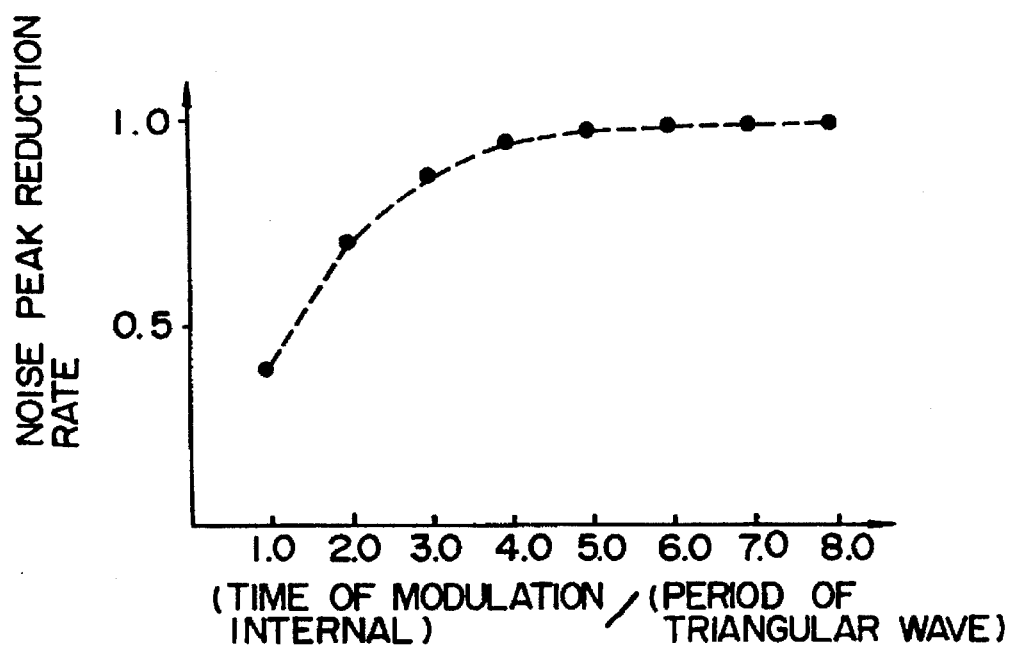
FIG. 10 is a graph showing the result of measuring the noise peak reduction rate while changing the interval of the modulation timings of the triangular wave signal.

A further experimental study was carried out for the relation between the time interval in modulation and the noise reduction effect. From the experimental study, it was also discovered that it is most effective to carry out the modulation at an interval equal to one cycle period of the triangular wave signal. The result of the experimental study is shown in FIG. 10. The experimental study was carried out based on the separately excited forward switching regulator explained in FIG. 13, using the center frequency of the triangular wave signal as 100 KHz and the modulation range of ±20% (80 KHz to 120 KHz), and the noise peak reduction effect was measured while changing the interval of modulations. The definition of the ordinate in FIG. 10 is the same as the definition of the ordinate in FIG. 7. The abscissa indicates the ratio of the modulation time of interval to one cycle period of the triangular wave signal. For example, the value of 1.0 means that the modulation is carried out in one-cycle period interval and the value of 2.0 means that the modulation is carried out in two-cycle period interval.

As shown in FIG. 10, it was discovered that the noise peak reduction effect becomes larger as the modulation interval is made smaller and the reduction effect becomes maximum in a one-cycle period interval of the triangular wave signal. This is because the dispersion effect increases when the modulation interval is made smaller.

Based on the above-described conditions, it is possible to achieve the frequency modulation with the most stable modulation timing and the most effective modulation interval.

Embodiments of the present invention which satisfy the above-described conditions will be explained below.

Figure 1:
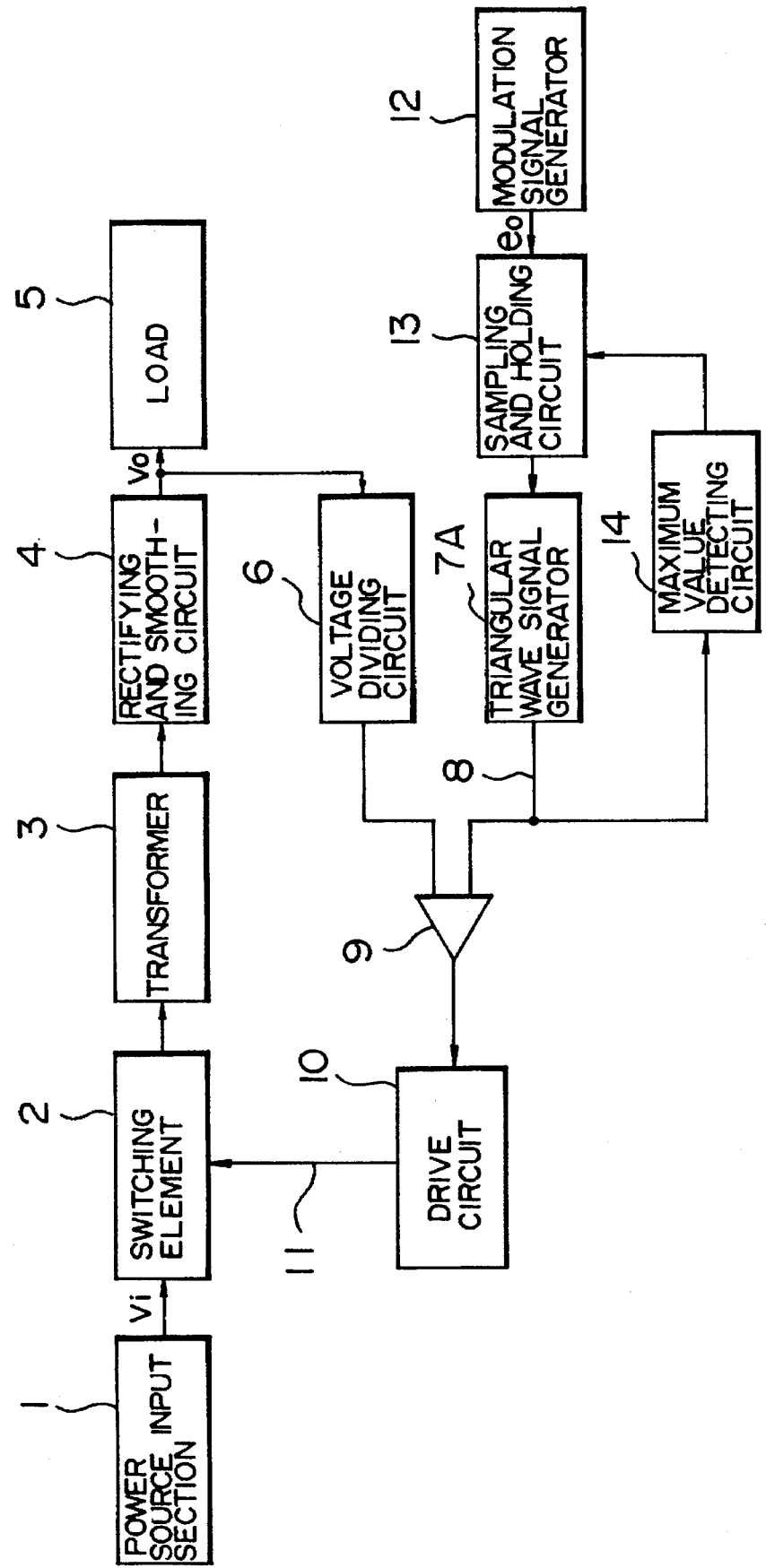
FIG. 1 is a block diagram showing the structure of the switching regulator according to a first embodiment of the present invention.

FIG. 1 shows a first embodiment of the present invention applied to the separately excited forward switching regulator.

Figure 13:
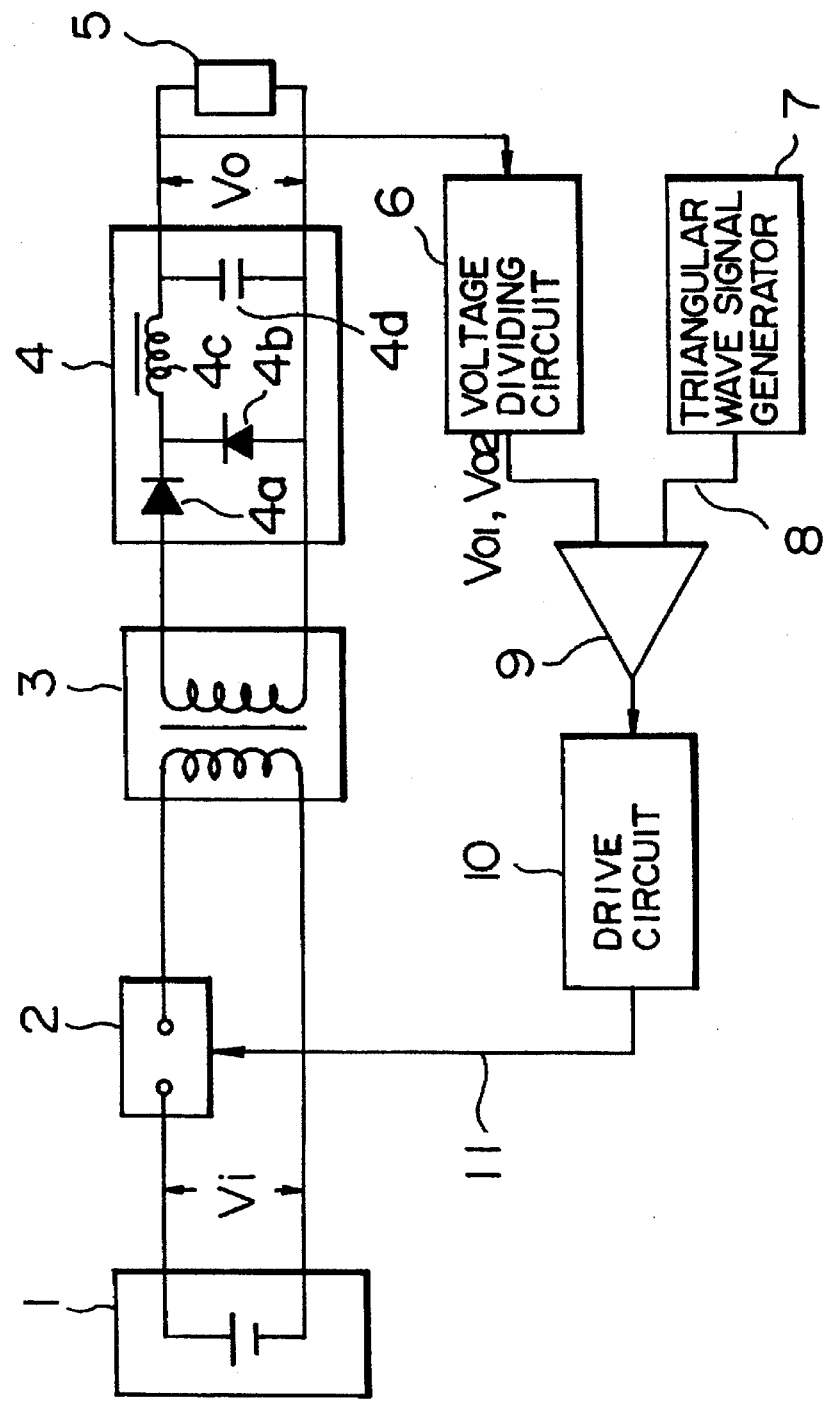
FIG. 13 is a block diagram showing the structure of the conventional switching regulator.
Figure 14A:
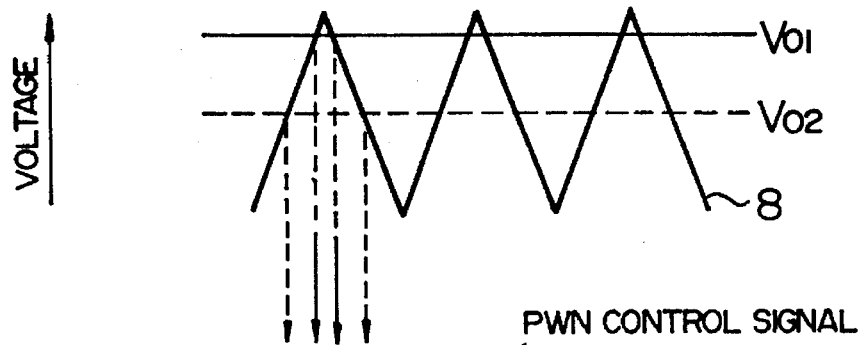
FIGS. 14A and 14B are timing charts for explaining the pulse-width modulation control in the conventional switching regulator.
Figure 14B:
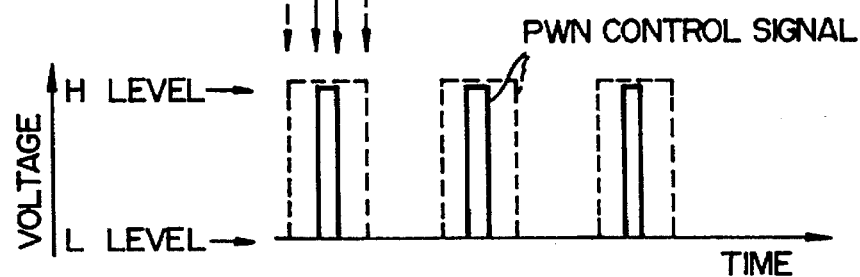
Figure 15:
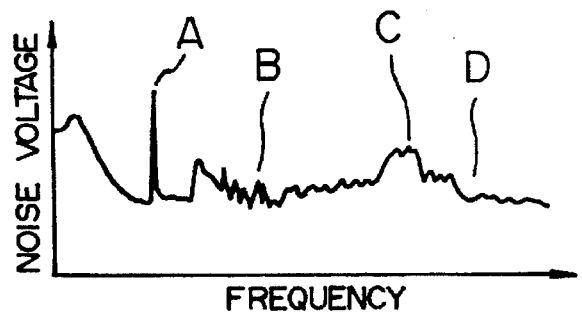
FIG. 15 is a graph showing an example of conduction noise in the conventional switching regulator.

Referring to FIG. 1, components other than a triangular wave signal generator 7 and a modulation signal generator 12 substantially correspond to the components of the same reference marks in FIG. 13. 12 designates a modulation signal generator for generating a modulation signal $e_0$ used for frequency modulating a triangular wave signal 8 at random, 13 designates a sampling and holding circuit for sampling the modulation signal $e_0$ at the timing of the maximum value of the triangular wave signal 8 and holding the sampled signal, and 14 designates a maximum value detecting circuit for detecting a maximum value of the triangular wave signal 8 and applying a sampling signal to the sampling and holding circuit 13.

The modulation signal $e_0$ is a signal having an amplitude which changes in asynchronism with the frequency of the triangular wave signal. In other words, the timing of the peak of the modulation signal $e_0$ is asynchronous with the timing of the minimum or maximum value of the triangular wave signal. As an example of the circuit for producing this modulation signal $e_0$, a random signal generator for random changing the amplitude is used. The operation of the circuit of the first embodiment in which the random signal generator is used as the modulation signal generator 12 shown in FIG. 1 will be explained below.

The random signal generator 12 always transmits the random signal $e_0$ having an amplitude which randomly changes to the sampling and holding circuit 13. On the other hand, the maximum value detecting circuit 14 detects a maximum value of the triangular wave signal 8 which is produced by the triangular wave signal generator 7, and outputs a sampling signal at each time of the detection or at every one-cycle period of the triangular wave signal.

The sampling and holding circuit 13 samples the random signal $e_0$ in response to the sampling signal and supplies the sampled random signal $e_0$ to the triangular wave signal generator 7 as a control signal for the frequency modulation. The triangular wave signal generator 7 controls the charging and discharging of a capacitor provided to the triangular wave signal generator 7 according to the level of the control signal. That is, when the triangular wave signal 8 reaches a predetermined maximum level, the charging is stopped and discharging is started at the same time. The triangular wave signal generator 7 is arranged to produce the triangular wave signal 8 whose frequency is modulated within a frequency range of about 0.8 to 1.2 times of a predetermined center frequency of the triangular wave signal 8.

According to the above arrangement, the frequency modulation of the triangular wave signal 8 is carried out at the timing of the maximum value of the triangular wave signal 8, so that there is no hunting which would cause waveform distortion in the triangular wave signal 8.

Further, since the triangular wave signal 8 is frequency-modulated in the range of about 0.8 to 1.2 times of the center frequency of the triangular wave signal 8, the transformer will never be over-heated by magnetic saturation. Therefore, it is possible to obtain an excellent effect in reduction of the noise peak, as shown in FIG. 7, without using a large-type transformer.

Further, since the modulation is carried out at the timing of every one-cycle period of the triangular wave signal 8, it is possible to obtain an excellent effect in reduction of the noise peak, as shown in FIG. 10.

Figure 2A:
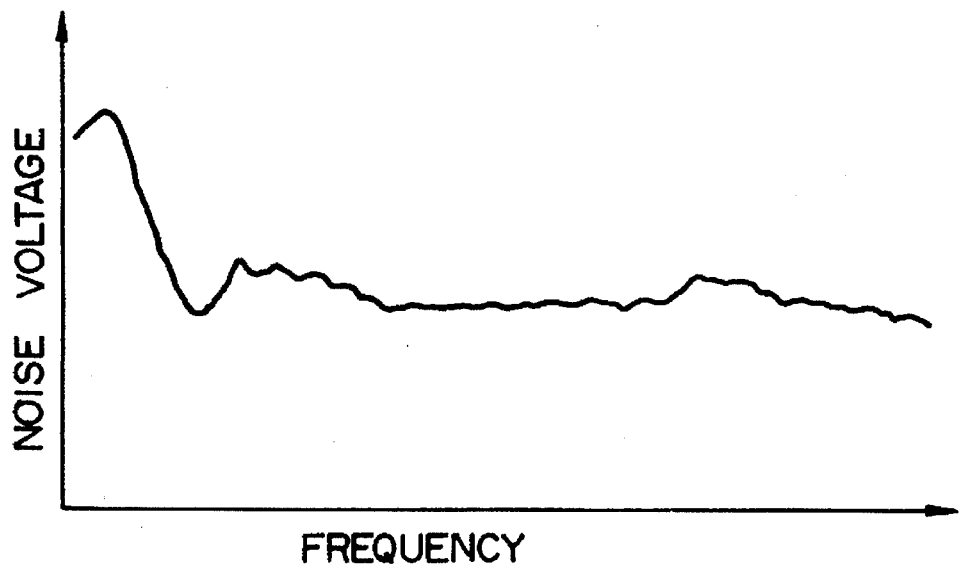
FIGS. 2A and 2B are diagrams for explaining the noise reduction effect in the first embodiment and in the conventional example, respectively.
Figure 2B:
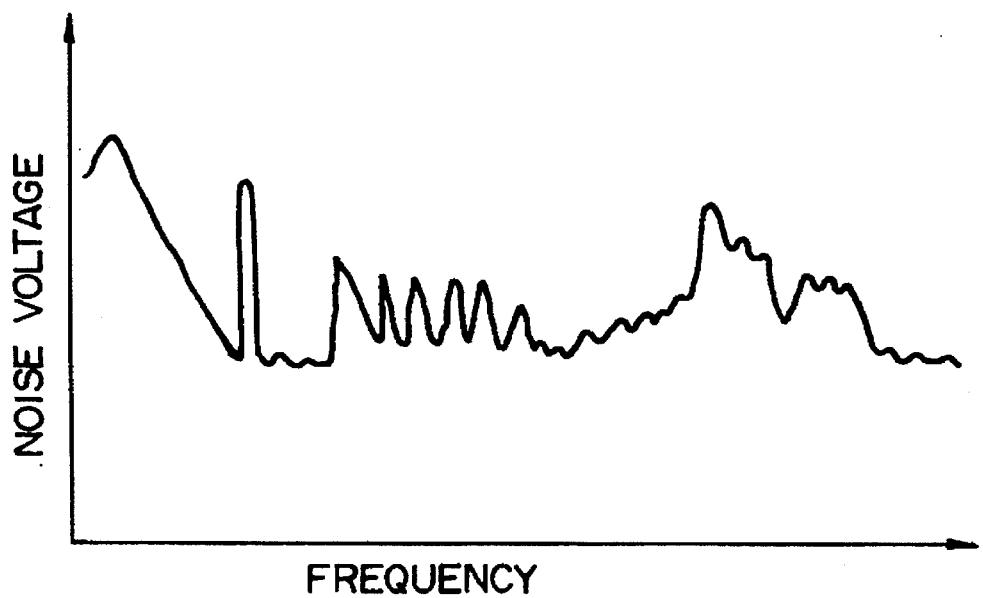

FIGS. 2A and 2B show the results of the experimental study. In FIGS. 2A and 2B, the ordinate indicates the noise voltage level and the abscissa indicates the frequency, and the unit and scale in FIG. 2A are the same as those in FIG. 2B. FIG. 2A shows the results measured in the present embodiment, and FIG. 2B shows the results measured in the conventional system shown in FIG. 13. By comparing FIGS. 2A and 2B, it is clear that the conduction noise produced when using the present embodiment is much lower than the conduction noise produced when using the conventional system. Further, of the output of the switching regulator of the present embodiment has the same high stability as that of the output of the conventional system. The circuit parts used are the same as those which are generally used in the switching regulator of 100 KHz and 50 W output, and it is not necessary to use any special element in carrying out the present embodiment. The cross sections of the transformer and the smoothing choke coil are increased by about 20% and the area of the circuit substrate is not substantially increased as compared with the area according to the conventional system.

Further, according to the present embodiment, the input voltage $V_I$ is 48 V, the output voltage $V_O$ is 5 V and the current is 10 A. The center frequency of the triangular wave signal is 100 KHz and the modulation is carried out at each one-cycle period of the triangular wave signal changing randomly in a frequency range of ±20 KHz about the center frequency, or a frequency range of 80 to 120 KHz.

Figure 3:
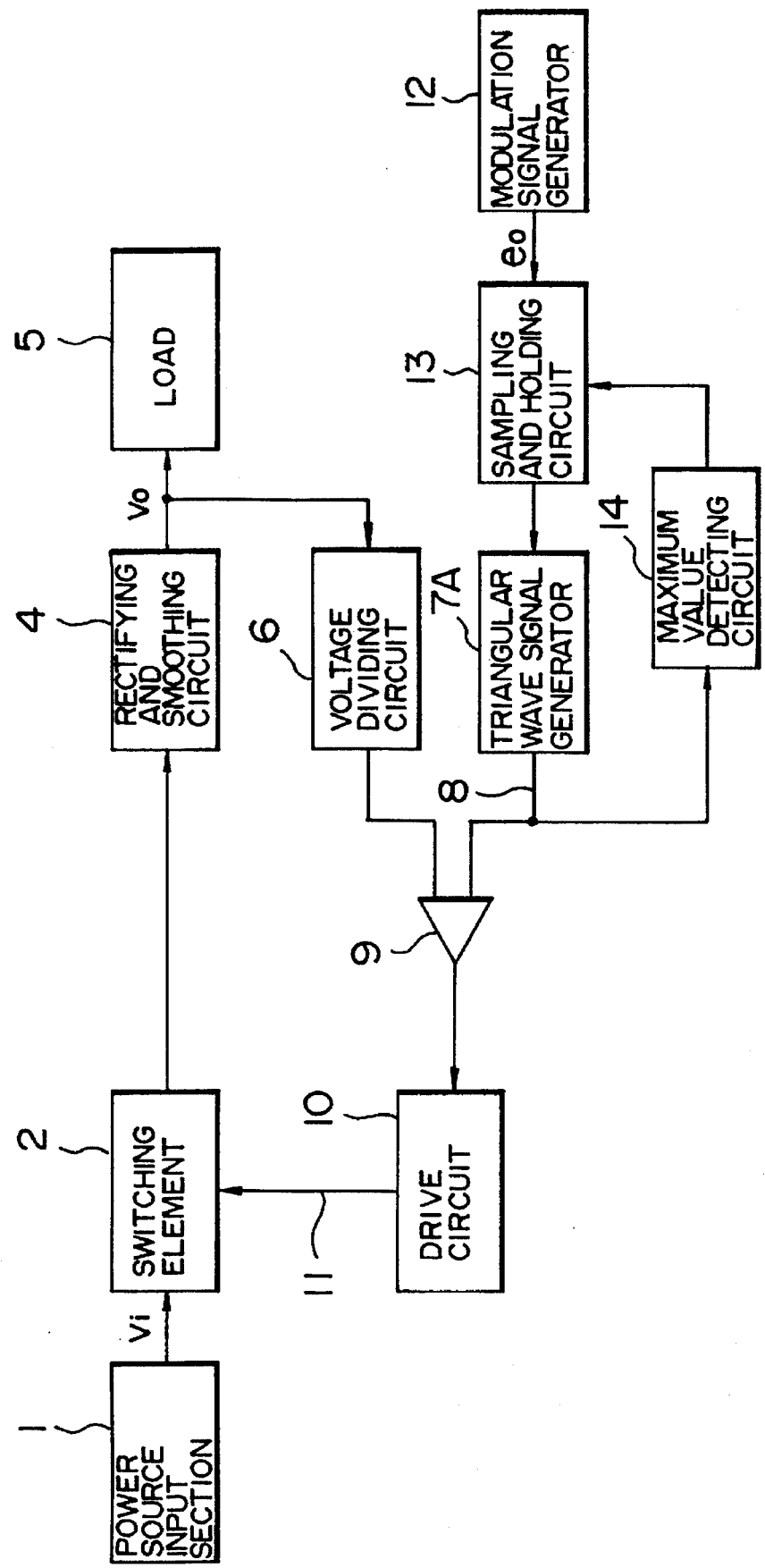
FIG. 3 is a block diagram showing the structure of the switching regulator according to a second embodiment of the present invention.

FIG. 3 shows a second embodiment of the present invention, applied to the separately excited chopper-type switching regulator. This has substantially the same structure as the structure of the first embodiment in FIG. 1 except that the transformer 3 is omitted in the second embodiment. The modulation signal generator 12 in FIG. 3 is a random signal generator like the first embodiment.

Figure 4A:
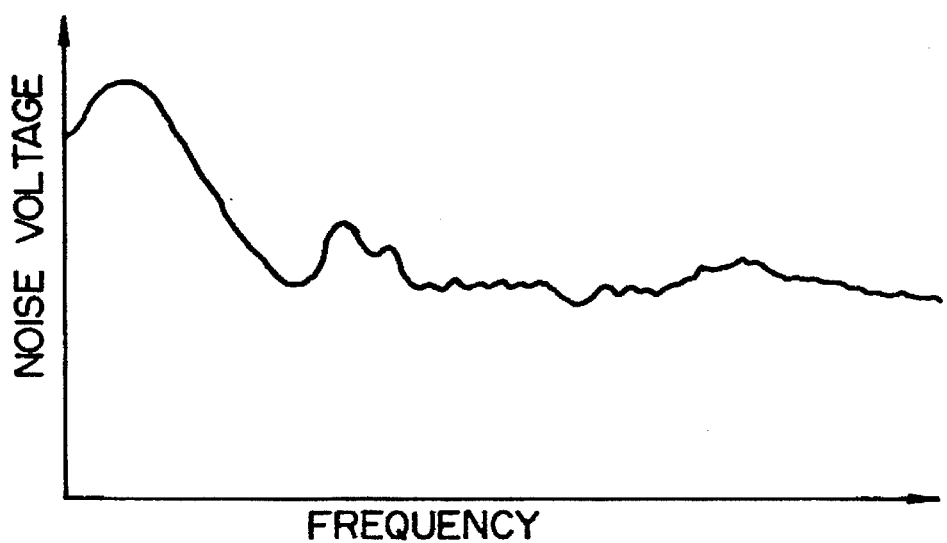
FIGS. 4A and 4B are diagrams for explaining the noise reduction effect in the second embodiment and in the conventional example, respectively.
Figure 4B:
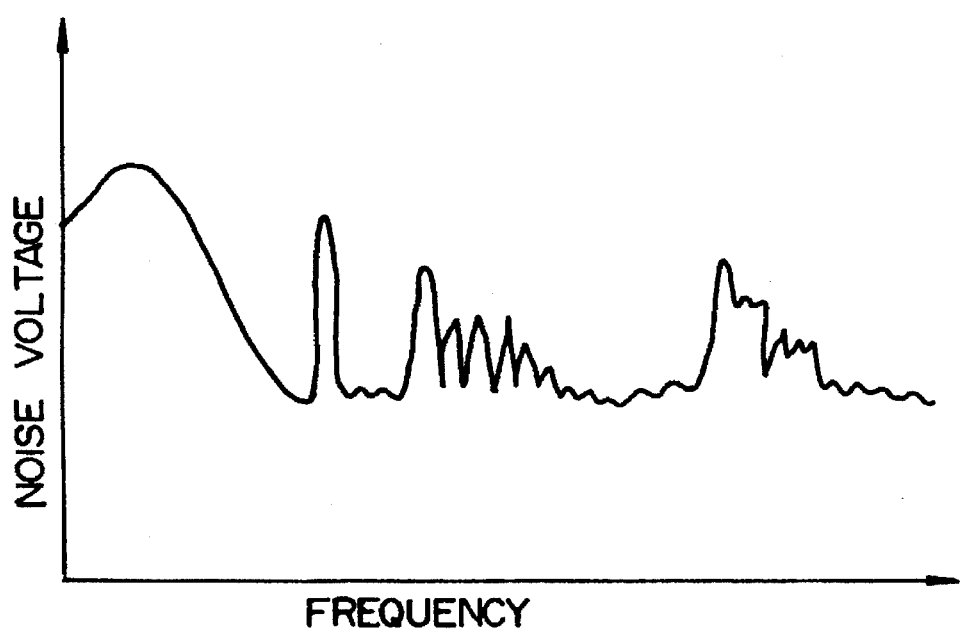

FIGS. 4A and 4B show the results of the experimental study in a case where the input voltage $V_I$ is 5 V, the output voltage $V_O$ is 12 V and the current is 3 A. The center frequency of the triangular wave signal is 200 KHz and the modulation is carried out at each one-cycle period of the triangular wave signal having a frequency changing randomly in a frequency range of ±40 KHz about the center frequency, or in a frequency range of 160 to 240 KHz. FIG. 4A shows the results measured in the present embodiment, and FIG. 4B shows the results measured in the conventional system. It is clear that the conduction noise in the present embodiment is much lower than the conduction noise in the conventional system. Further, the stability of the output voltage $V_O$ is substantially the same as that of the output voltage of the conventional system.

The conventional system refers to an arrangement substantially the same as that shown in FIG. 3, except that the circuits 12, 13 and 14 are omitted from FIG. 3 and the triangular wave signal as produced has a fixed frequency of 200 KHz.

Figure 5:
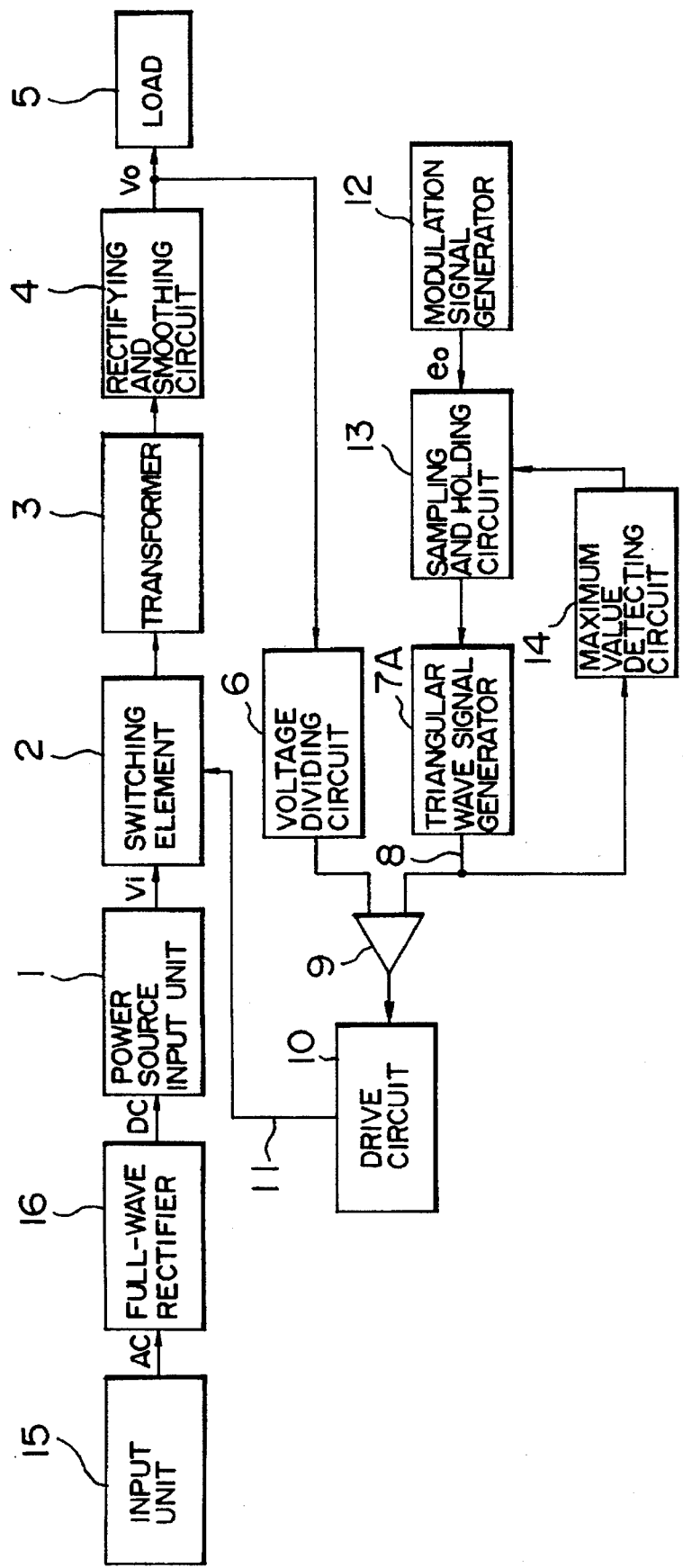
FIG. 5 is a block diagram showing the structure of the switching regulator according to a third embodiment of the present invention.

FIG. 5 shows a third embodiment of the present invention applied to the separately excited flyback-type switching regulator. In FIG. 5, 15 designates an input section for receiving an AC voltage. 16 designates a full-wave rectifier having a diode bridge for full-wave rectifying the AC voltage and smoothing the rectified AC voltage by a capacitor thereby generating a DC voltage. All other portions are the same as those in the first embodiment shown in FIG. 1. The modulation signal generator 12 in FIG. 5 is a random signal generator like the first embodiment.

Figure 6A:
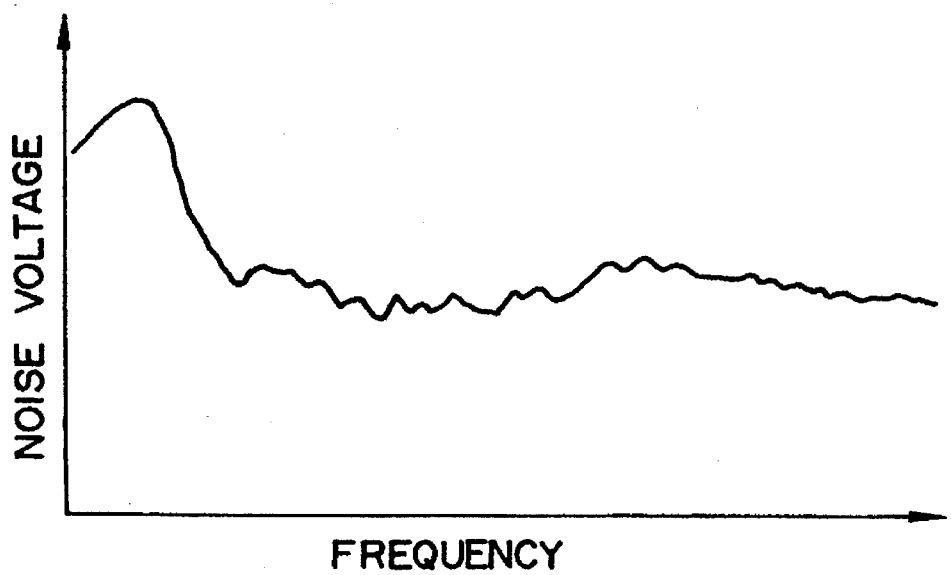
FIGS. 6A and 6B are diagrams for explaining the noise reduction effect in the third embodiment and in the conventional example, respectively.
Figure 6B:
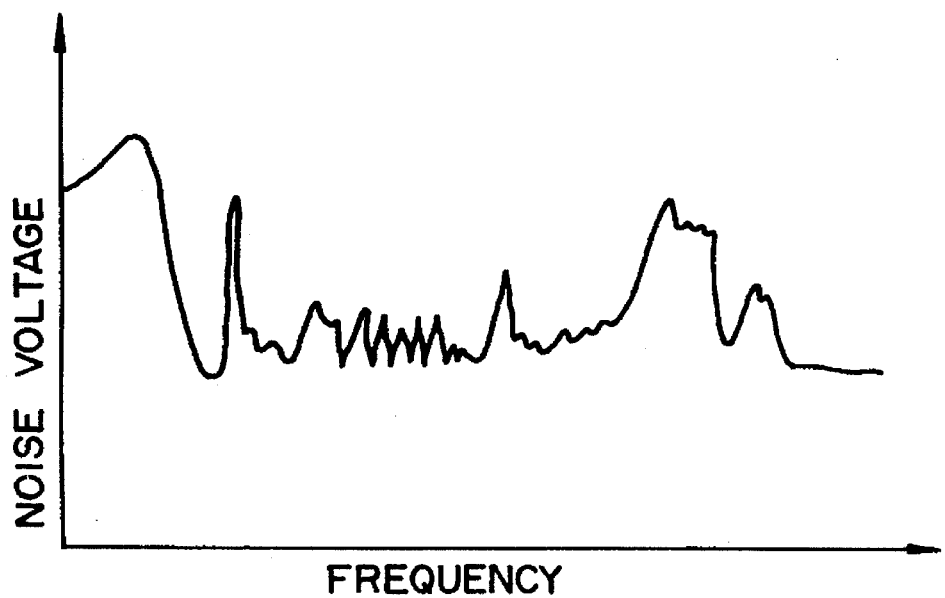

FIGS. 6A and 6B show the results of the experimental study. FIG. 6A shows the results measured in the present embodiment and FIG. 6B shows the results measured in the conventional system. In each case, the output voltage $V_O$ is 12 V and the current is 10 A. The center frequency of the triangular wave signal is 50 KHz and the modulation is carried out at each one-cycle period of the triangular wave signal having a frequency changing randomly in a frequency range of ±10 KHz about the center frequency, or in frequency range of 40 to 60 KHz. The conventional system, which undergoes no frequency modulation and has the same input/output specification as that of the present embodiment, has substantially the same arrangement as shown in FIG. 5 except that the circuits 12, 13 and 14 are omitted from FIG. 5 and the triangular wave signal as produced has a fixed frequency of 50 KHz. By comparing FIGS. 6A and 6B, it is clear that the conduction noise at the input section 15 in the present embodiment is much lower than the conduction noise in the conventional system. Further, the stability of the output in the present embodiment is the same as the output in the conventional system source.

In each of the above-described embodiments, it is possible to reduce the peak voltage of the noise frequency generated in the switching regulator. Although only one switching element is used in each of these embodiments, it is also possible to implement the present invention in a circuit using two or more switching elements such as the half-bridge or full-bridge circuit, with the same effect. Further, although the effect in reduction of the conduction noise has been described in each embodiment, it is also possible to reduce radiation noise by using any of the present embodiments. This is because the radiation noise is generated by an electromagnetic wave which is derived from change of a current inside the switching power source circuit and radiated to outside and according to the present embodiment, it is possible to disperse the frequency of the current change within a predetermined frequency range.

Further, although the random signal generator for randomly changing the amplitude is used as the modulation signal generator 12 in the above embodiments, a circuit for producing a signal of which the amplitude changes at a constant frequency different from the frequency of the triangular wave signal may be used as the modulation signal generator. When the frequency of a modulated triangular wave signal changes in a range of 80 to 120 KHz, the modulation signal generator 12 generates a modulation signal of which the amplitude changes in the frequency of, for example, 20 KHz or 200 KHz, outside the range of 80 to 120 KHz. The waveform of the modulation signal may be a sinusoidal wave, a triangular wave or any other waveform.

Figure 11A:
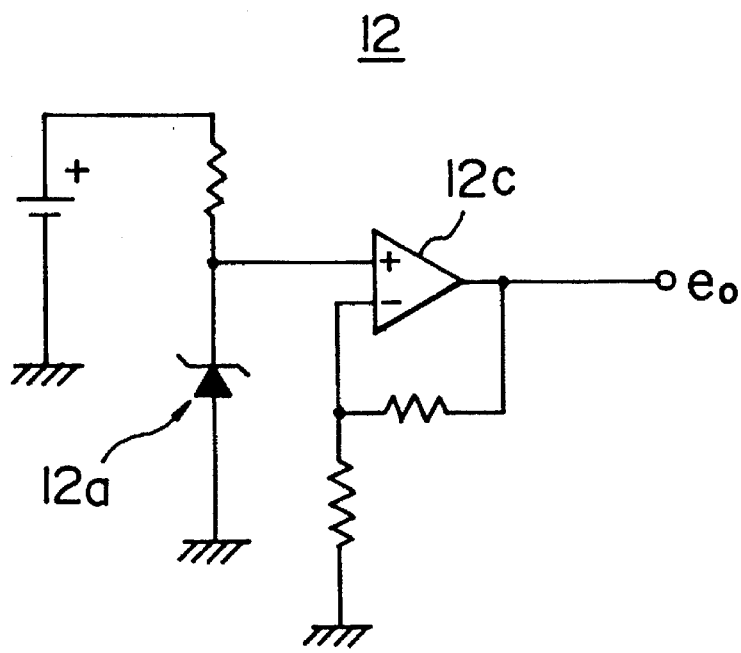
FIGS. 11A, 11B and 11C are diagrams showing the structures of the modulation signal generators of various types.
Figure 11B:
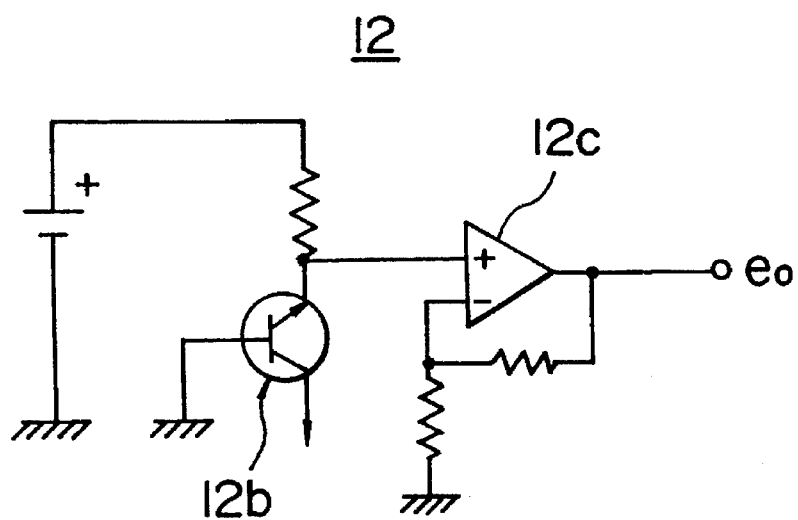
Figure 11C:
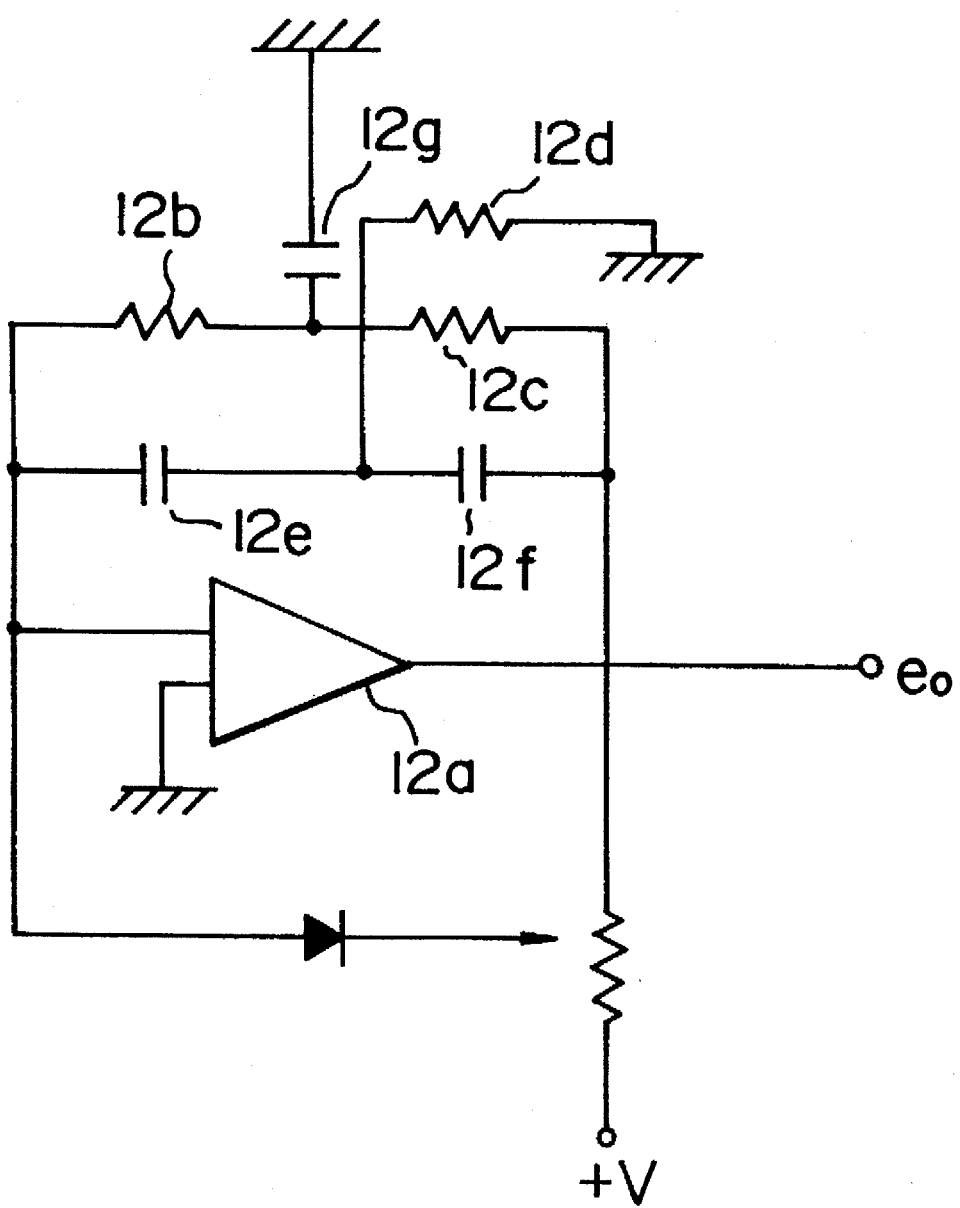

FIGS. 11A, 11B and 11C are diagrams showing the structures of various kinds of modulation signal generators. FIGS. 11A and 11B show examples of the random signal generator for generating random signals of which amplitude changes at random, and FIG. 11C show the modulation signal generator 12 which generates a sinusoidal wave signal having a constant frequency outside the modulation frequency range of the triangular wave signal.

In FIG. 11A, by applying a power source voltage to a constant voltage diode 12a, white noise generated in the constant voltage diode 12a is amplified by an amplifier 12c so that the random signal $e_0$ as a noise voltage is obtained. FIG. 11B is the same as FIG. 11A except that the transistor 12B is used in stead of the constant voltage diode 12a.

With the above-described structure, it is not necessary to use an IC for logic, an IC for a clock or an IC for DA conversion, etc., unlike the conventional system, and thus it is also possible to simplify the circuit structure. Further, there is no occurrence of noise due to the clock which drives each IC.

The modulation signal generator 12 in FIG. 11C includes a sinusoidal wave oscillator using an operation amplifier 12a. The modulation signal $e_0$ of a sinusoidal wave voltage is obtained with an oscillation frequency determined by resistors 12b, 12c and 12d and capacitors 12e, 12f and 12g.

With the above-described structure, it is possible to simplify the circuit structure without using the IC for logic, IC for clock or IC for DA conversion unlike the conventional circuit, thus simplifying the circuit structure. Further, there is no occurrence of noise due to a clock for driving each IC. Further, there hardly occurs deviation and there hardly affected by external noise. In the above structure, it is possible to obtain a different modulation signal $e_0$ in each sampling, because the sinusoidal wave has an amplitude changing at a frequency outside the frequency range of the triangular wave signal 8 and the timing of sampling changes at each sampling, so that the triangular wave signal 8 is not synchronized with the modulation signal $e_0$. Although the sinusoidal wave signal is used as the modulation signal $e_0$ in FIG. 11C, a triangular wave signal may be used as the modulation signal $e_0$. When the modulation signal $e_0$ is generated and the frequency and the amplitude of the modulation signal $e_0$ are adjusted in the above structure, it is possible to control the dispersion in the frequency range of the triangular wave signal 8.

Figure 12:
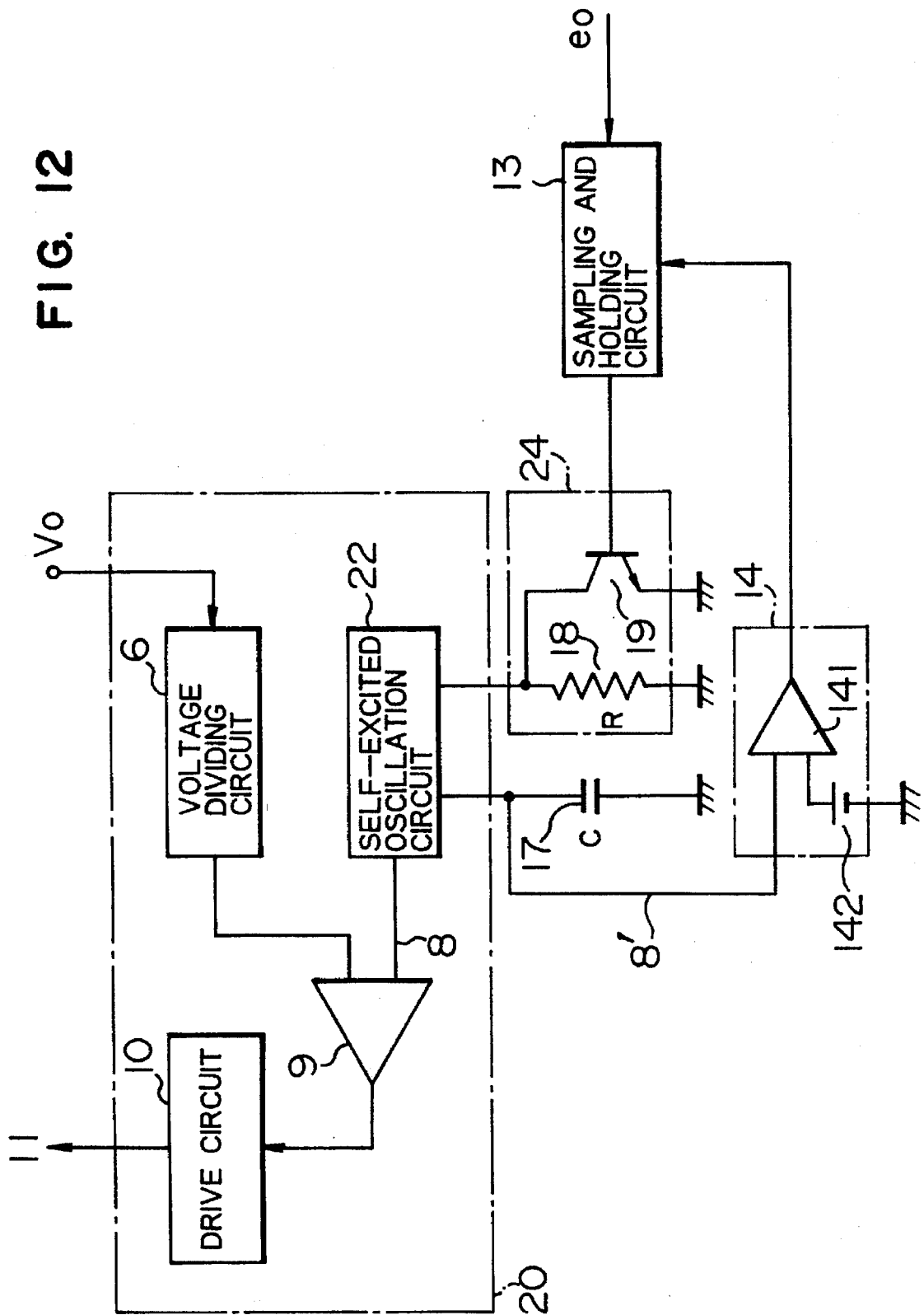
FIG. 12 is a diagram showing the circuit structure of the control unit.

FIG. 12 shows the structure of the triangular wave signal generator 7A and the circuits connected thereto in the above-described embodiments. Referring to FIG. 12, in a self-excited oscillator 22 of externally CR-connection type, the connected capacitor C is charged by a current inversely proportional to the connected resistor R. When the voltage across the capacitor C has reached a predetermined level, the capacitor C starts discharging, and immediately when the discharging is finished, the charging is started again. This is repeated, and the voltage across the capacitor C provides a triangular waveform which changes at a frequency inversely proportional to a time constant CR which is determined by the values of the capacitor C and the resistor R. The circuit including the oscillation circuit 22 and the capacitor 17, the resistor 18 and the transistor 19 connected to the oscillation circuit 22 in FIG. 12 corresponds to the triangular wave signal generator 7A shown in FIG. 1. In the circuit of FIG. 12, since the transistor 19 is connected in parallel with the resistor 18, a triangular wave signal of a frequency which is inversely proportional to a time constant $CR^0$ determined by an effective resistance $R^0$ of a parallel circuit 24 of the resistor 18 and the transistor 19 and the capacitance C of the capacitor 17 is generated across the capacitor 17. In the above-described structure of the triangular wave signal generator 7A, the components other than the transistor 19 are the same as those of the triangular wave generator 7 in the conventional apparatus shown in FIG. 13.

The voltage signal 8' produced across the capacitor 17 has a voltage level equal to the triangular wave signal 8. The comparator 8 compares the voltage signal 8' with the output voltage of the voltage dividing circuit 6 and produces a pulse width modulated signal. The pulse width modulated signal is amplified by the drive circuit and is then used for controlling the turning-on and -off of the switching element 2. The comparator 9 and the drive circuit 10 are the same as those shown in FIG. 13.

The voltage signal 8' equal to the triangular wave signal 8 produced across the capacitor 17 is also given to the maximum value detecting circuit 14. The maximum value detecting circuit 14 includes a comparator 141 and a constant voltage source 142 for producing a constant voltage equal or near to the maximum value of the triangular wave signal 8. The voltage signal 8' equal to the triangular wave signal 8 is compared with the constant voltage 142 by the comparator 141 thereby to produce an output signal at a timing corresponding to the maximum value of the triangular wave signal. The sampling and holding circuit 13 samples the voltage value corresponding to the amplitude of the modulation signal $e_0$ at the timing of generation of the output signal of the maximum value detecting circuit and holds the sampled voltage value. The voltage value as sampled and held is applied to the base of the transistor 19 to control the current flowing through the transistor 19, so that the effective resistance $R^0$ of the parallel circuit 24 of the resistor 18 and the transistor 19 is controlled by the output voltage of the sampling and holding circuit 13. As a result, the frequency of the triangular wave signal generated from the oscillation circuit 22 is modulated to a value corresponding to the amplitude value of the modulation signal $e_0$ which is sampled and held by the sampling and holding circuit.

The oscillation frequency of the self-excited oscillator 22 is determined as a function of $CR^0$ when the capacitance of the capacitor 17 is C and the effective resistance of the parallel circuit of the resistor 18 and the transistor 19 is $R^0$. Accordingly, in order to modulate the frequency of the triangular wave signal within a range of 1.8 to 1.2 times of the center frequency of the triangular wave signal, the range in change of the effective resistance $R^0$, or the range in change of the signal applied from the sampling and holding circuit is determined so that the ratio of the maximum value of the oscillation frequency to the minimum value thereof is 1.2 to 0.8. In manufacturing the apparatus, output voltages $v_1$ and $v_2$ of the sampling and holding circuit corresponding to the maximum value of the oscillation frequency and the minimum value thereof, respectively, taken when the ratio of the maximum value to the minimum value is 1.2 to 0.8, are experimentally determined and the amplitude of the modulation signal generated by the modulation signal generator 12 is determined so as to have a waveform which changes between $v_1$ and $v_2$.

As the circuit 20 which includes the self-excited oscillator 22, the comparator 9, the drive circuit 10 and the voltage dividing circuit 6, IC control circuit having the same function used for switching regulator is commercially available, such as, for example, TL494 manufactured by the Texas Instruments Inc. and μPC1094 manufactured by Nippon Electric Co., Ltd. When such commercially available circuit is used, it is possible to structure the control circuit 20 by only connecting the capacitor 17, the resistor 18 and the transistor 19 to the IC circuit.

The transistor 19 may be an FET or a photo-coupler or the like, and the transistor may be connected in series with the resistor 18. The transistor 19 may also be structured by a plurality of resistors, transistors, FET's and photo-couplers to achieve fine control. Since the widely-used IC circuit used for controlling the switching regulator can be utilized as described above, it is possible to directly utilize the overvoltage restricting circuit, the over-current restricting circuit, the feedback circuit, etc. which are usually equipped in the IC, to thereby simplify the circuit designing.

We claim:

1. A switching regulator, comprising:

a switching element connected to receive an input DC signal for turning-on and -off said input DC signal to produce an AC signal;

a rectifier for rectifying said AC signal thereby generating an output voltage;

a circuit for producing a frequency-variable triangular wave signal having a constant amplitude;

means for comparing said triangular wave signal with said output voltage of said rectifier thereby obtaining a pulse-width modulated signal used for controlling an operation of said switching element;

a modulation signal generator for generating a modulation signal having an amplitude variable in asynchronism with a frequency of said triangular wave signal;

a sampling and holding circuit for sampling said modulation signal in synchronism with a time of a maximum or minimum value of said triangular wave signal, and holding the sampled modulation signal; and a circuit for modulating the frequency of said triangular wave signal in synchronism with said time of a maximum or minimum value of said triangular wave signal, based on a voltage value of said modulation signal as sampled and held.

2. A switching regulator according to claim 1, wherein said AC signal is a rectangular wave signal.

3. A switching regulator according to claim 1, wherein said modulation signal generator is a random signal generator for generating a signal of which an amplitude changes at random.

4. A switching regulator according to claim 1, wherein said modulation signal generator is a circuit for generating a modulation signal having a constant frequency outside of a modulated frequency range of said triangular wave signal.

5. A switching regulator, comprising:

a switching element connected to an input DC signal and operating for turning-on and -off said input DC signal to produce an AC signal;

a rectifier for rectifying said AC signal thereby generating an output voltage;

means for producing a frequency-variable triangular wave signal having a constant amplitude;

means for comparing said triangular wave signal with the output voltage of said rectifier thereby obtaining a pulse-width modulated signal for controlling said switching element;

a modulation signal generator for generating a modulation signal which has an amplitude variable in asynchronism with a frequency of said triangular wave signal;

a sampling and holding circuit for sampling said modulation signal in synchronism with the frequency of said triangular wave signal and holding said sampled modulation signal; and a circuit for modulating the frequency of said triangular wave signal within a range of about 0.8 to 1.2 times of a predetermined center frequency at a timing of a maximum or minimum value of the triangular wave signal based on a value of said sampled modulation signal.

6. A switching regulator according to claim 5, wherein said AC signal is a rectangular wave signal.

7. A switching regulator according to claim 5, wherein said modulation signal generator is a random signal generator for generating a signal of which an amplitude changes at random.

8. A switching regulator according to claim 5, wherein said modulation signal generator is a circuit for generating a modulation signal having a constant frequency outside a modulated frequency range of said triangular wave signal.

9. A switching regulator, comprising:

a switching element connected to an input DC signal for turning-on and -off said input DC signal to produce an AC signal;

a rectifier for rectifying said AC signal thereby generating an output voltage;

a circuit for producing a frequency-variable triangular wave signal having a constant amplitude;

means for comparing said triangular wave signal with the output voltage of said rectifier thereby obtaining a pulse-width modulated signal used for controlling an operation of said switching element;

a modulation signal generator for generating a modulation signal having an amplitude variable in asynchronism with a frequency of said triangular wave signal;

a sampling and holding circuit for sampling the modulation signal at a maximum or minimum value of said triangular wave signal and holding said sampled modulation signal; and a circuit for modulating the frequency of said triangular wave signal within a range of about 0.8 to 1.2 times of a predetermined center frequency in synchronism with said maximum or minimum value of the triangular wave signal, based on said sampled modulation signal.

10. A switching regulator according to claim 9, wherein said AC signal is a rectangular wave signal.

11. A switching regulator according to claim 9, wherein said modulation signal generator is a random signal generator for generating a signal of which an amplitude changes at random.

12. A switching regulator according to claim 9, wherein said modulation signal generator generates a modulation signal having a constant frequency outside a modulated frequency range of said triangular wave signal.

* * * * *